United States Patent [19]

Waters et al.

[11] Patent Number: 4,925,708
[45] Date of Patent: May 15, 1990

[54] PROCESS FOR PRODUCING LIQUID CRYSTAL DEVICES

[75] Inventors: Colin M. Waters, Frodsham; Timothy J. Noakes, Selbourne, Near Alton; Ian Pavey, Fernhurst, Near Haslemere, all of England

[73] Assignee: Imperial Chemical Industries PLC, London, England

[21] Appl. No.: 285,447

[22] Filed: Dec. 16, 1988

[30] Foreign Application Priority Data

Dec. 16, 1987 [GB] United Kingdom ................ 8729344
May 23, 1988 [GB] United Kingdom ................ 8812135

[51] Int. Cl.$^5$ ............................................. C09K 19/00
[52] U.S. Cl. .................................... 428/1; 156/273.1; 156/275.3; 156/292; 350/334; 427/13; 427/14.1
[58] Field of Search .................. 156/167, 273.1, 273.3, 156/273.5, 275.1, 275.3, 275.5, 275.7, 276, 292; 428/1; 350/334; 427/13, 14.1

[56] References Cited

U.S. PATENT DOCUMENTS 4,411,495 10/1983 Beni et al. .................. 350/347 V
4,526,818  7/1985 Hoshikawa et al. ................ 428/1

OTHER PUBLICATIONS

Derwent Abstract for German specification No. 3543204 (Jun. 1987).
Derwent Abstract for Japanese specification No. 58100122 (Jun. 1983).

Primary Examiner—Robert A. Dawson
Attorney, Agent, or Firm—Cushman, Darby & Cushman

[57] ABSTRACT

A method of making a liquid crystal device comprises producing, for example by means of electrostatic spraying, ligaments of a curable liquid which are deposited as such or as droplets (as a result of breaking up of the ligaments) on a sheet which is to form one boundary wall of the device. Curing of the liquid may be initiated while the liquid is in flight and completed after deposition. Liquid crystal material is applied to the deposited ligaments or droplets and a second sheet is laminated with the first sheet to encapsulate the liquid crystal material. The deposited ligaments or droplets serve to space the sheets apart and/or provide surfaces with which, in the field-off condition, the liquid crystal molecules can align in directions different to the direction of alignment induced by application of an electric or magnetic field.

25 Claims, 5 Drawing Sheets

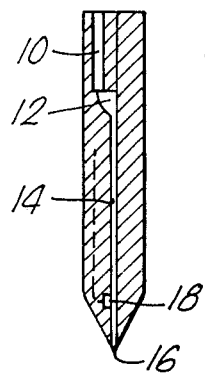
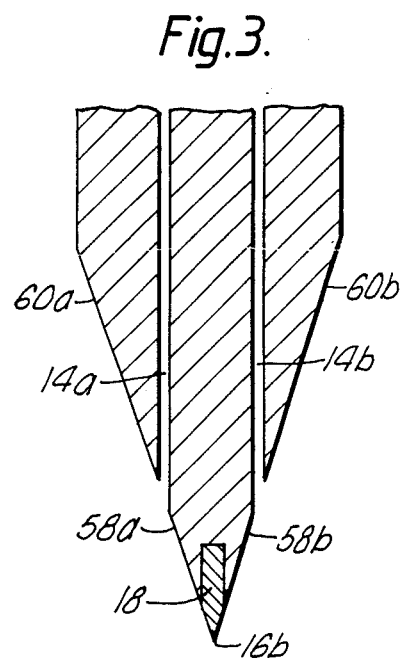
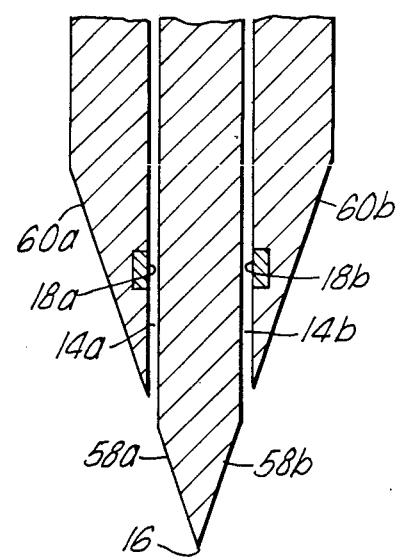

PROCESS FOR PRODUCING LIQUID CRYSTAL DEVICES

This invention relates to a method of making liquid crystal devices such as are used in displays and optical shutters, especially large area devices.

Liquid crystal displays are known comprising a layer of liquid crystal, sandwiched between two light transmitting sheets, e.g. glass or polyethersulphone (PES). PES is available under the trade mark STABAR. Areas (e.g. pixels) of the layer of liquid crystal can be addressed by transparent conductors on the inside surfaces of the light transmitting sheets by means of which a voltage is applied to align molecules in the areas of the liquid crystal.

The effect of the molecules realigning is used in, for example, twisted nematic (TN) displays, supertwisted birefringent effect (SBE) displays and surface-stabilized ferroelectric liquid crystal (SSFLC) displays.

In twisted nematic displays when no voltage is applied, the optical axis of the liquid crystal is parallel to the light transmitting sheets. The surfaces of the sheets are treated to anchor the local optical axis so that the local optical axis at the boundary with one sheet is at right angles to the local optical axis at the boundary with the other sheet. The direction of the local optical axis undergoes a twist between sheets. Polarizers are placed adjacent each sheet so that the direction of vibration of the light transmitted therethrough is parallel to the orientation of the adjacent local optic axis. The twisted nematic structure guides the direction of vibration of the polarized light so that it emerges from the layer polarized in the proper direction to pass through the second polarizer. When voltage is applied to the electrodes on the inside of the light transmitting sheets, the optic axis orients parallel to the field and loses its twisted structure so that it no longer rotates the polarization direction. The polarized light passing through the cell intersects the second polarizer in the crossed position and is absorbed.

Supertwisted birefringent effect displays operate in a broadly similar manner. The liquid crystal structure contains natural twist from one molecular layer to the next and the layer thickness is chosen so that a total twist of, say, 270 degrees is obtained. The light transmitting sheets may need to be surface treated so as to give a degree of tilt to the molecular orientation, in contrast to the TN displays where the orientation is parallel to the general plane of the sheets.

In SSFLC displays, the liquid crystal has a layered structure. The layers are arranged normal to the plane of the light transmitting sheets. The display includes crossed polarizers one on each side as in the TN display. Application of a voltage of one polarity across the liquid crystal orients the molecules so that the polarization vector points in one direction normal to the light transmitting sheets. This orients the molecular axis parallel to the vibration direction of the polarized light. The polarized light excites only a single optical normal mode which passes unchanged through the layer and is completely absorbed by the second polarizer, which is crossed with the first one. This molecular configuration is unchanged until a pulse of opposite polarity is applied to the layer. Another state is then adopted in which the molecules reorient within the smectic layers, maintaining the same molecular tilt angle, so that the polarization vector points in the opposite direction. If, for example, the molecular tilt angle is 22.5 degrees, in the new configuration the molecular axis makes an optimal 45 degrees with the vibration angle of the polarized light. If the birefringence and the thickness of the cell are chosen correctly, the liquid crystal in this orientation acts as a half-wave retardation plate which effectively rotates the vibration direction of the polarized light by 90 degrees so that is can pass through the second polarizer.

Owing to the liquid nature of the liquid crystal layer, the light transmitting sheets have to be spaced apart. In small displays where the sheets are glass, the spacing can be provided from the edges. In larger displays or where the light transmitting sheets are PES, spacing is required at intervals all over the sheets. The separation may be from 2 microns to 20 microns, dependent on the particular device.

Conventionally, spacing is provided by ceramic beads, e.g. in SSFLC displays alumina beads have been used. Present tolerance on their diameter is about 10% for SBE and SSFLC displays, and even these are very expensive to produce. Still closer tolerances, e.g. 2%, are however desirable.

In accordance with one aspect of the present invention there is provided a method of making a liquid crystal device including the steps of:

(a) directing towards a first sheet which is to form a boundary wall of the device ligaments derived from a curable liquid and allowing the ligaments to deposit as such or as droplets resulting from breaking up of the ligaments;

(b) assembling a second sheet in superimposed relation with the first sheet so that the deposited ligaments or droplets occupy the space between the sheets; and (c) applying liquid crystal material so that it permeates the spaces between the deposited ligaments or droplets.

In accordance with a second aspect of the invention there is provided a method of making a liquid display, including: spraying a curable liquid by a process comprising delivering the liquid to a spraying site of an electrostatic spray head, making electrical contact with said liquid via an electrically conducting or semiconducting liquid contacting surface, charging the liquid contacting surface to a high voltage of one polarity relative to a reference surface, to intensify the electric field strength at the spraying site sufficiently that the liquid at the spraying site is drawn out preponderantly by electrostatic forces into at least one cone from which a corresponding ligament issues directed towards one surface of a sheet so that on impact with the sheet the liquid both wets or adheres to the sheet and retains a substantial thickness relative to is diameter in flight.

It is possible to lay the liquid on the sheets in the form of ligaments. However, this may cause diffraction and where diffraction effects are to be avoided it is expected to be more usual to allow the ligaments to break up into charged droplets.

The droplets are closely similar in size, provided the liquid is not too visco-elastic. In complete absence of visco-elasticity droplets of one fundamental size would be produced exclusively. Visco-elasticity tends to produce droplets containing multiples of the volume of the fundamental. Thus in a real liquid there is a tendency to produce at least some droplets of double volume along with the fundamental size droplets. The effect on the thickness of the spacer produced is not that great, however. Doubling the volume only increases the diameter of the droplets (in flight) by 20% or so. However the double volume droplets will carry twice the charge producing a higher impact velocity. At a given impact velocity the larger droplets will have a greater momentum. All of which will tend to produce greater flattening of the larger droplets as they hit the light transmitting sheet.

Advantageously, the process may include treating the liquid in flight to initiate curing.

Initiating cure in flight has the advantage that the liquid, as sprayed, can have a relatively low viscosity, say up to 200 centistokes (preferably less than 100 centistokes), but the liquid as it hits the light transmitting sheet can have a higher viscosity sufficient to retain a substantial thickness despite the impact with the sheet. That is important if the droplet is still charged as the impact velocity could be in the region of 1 to 5 m/s. Indeed, the liquid on impact could be virtually cured having a tacky surface to adhere to the sheet.

In one example of a method embodying the invention, the cure of the liquid is completed after assembling the sheets together so that the liquid adheres to both sheets.

Alternatively, the cure of the liquid is completed before assembling the sheets together. In this alternative, a second liquid may be sprayed by the said process towards the surface of one or other of the sheets, the second liquid being curable to form a pressure sensitive adhesive. The second liquid is treated in flight to initiate curing so that on impact with the sheet the second liquid both wets or adheres to the sheet and retains a thickness greater than that of the spacers. The sheets are then assembled so that said adhesive acts to hold the sheets together at a spacing determined by the spacers.

In another alternative, a second or the same curable liquid is sprayed by the said process towards the surface of one or other of the sheets and treated in flight to initiate curing so that on impact with the sheet the second liquid both wets or adheres to the sheet and retains a thickness greater than that of the spacers when cured. The sheets are assembled and the cure of the said second or same liquid is completed to thereby hold the sheets together at a spacing determined by the spacers.

In a known form of liquid crystal device intended for use in optical shutter applications, a thin layer of liquid crystal material which is sensitive to electrical fields (e.g. material having positive or negative dielectric anisotropy) is located between two electrodes, changes in the electric field produced when a different electrical potential is applied across the electrodes serving to change the orientation state of the liquid crystals, e.g. between orientation in a plane parallel to the applied field direction and orientation perpendicular to that plane.

Such changes in orientation states can change the effective refractive index of the liquid crystal material, and the absorption plane of any pleochroic dye in the composition. Thus the observed effect in the device as the field is changed may, for example, be a change between a coloured absorbing state and a clear, transparent state, the colour being due to absorption of the light by the pleochroic dye. In either case, by using suitably transparent walls on both sides of the device, it can be used as a transmissive device from which light emerges from the other side modulated to a degree dependent on the applied field, having been scattered or absorbed as it passed through, or it can be used in reflective mode by making the reverse face reflective.

In the past, the liquid crystal layer has been enclosed between two glass plates sealed around their edges to form a cell but, more recently, attention has focussed on the use of more flexible materials to enclose the liquid crystal and one approach has been to encapsulate the liquid crystal as droplets in a matrix of polymeric material such as polyvinyl alcohol, as disclosed in for example French Pat. No. 2139537. One drawback with this approach is that the voltage that has to be applied to change the liquid crystal device from one state (e.g. the opaque state) to the other (e.g. transparent) is relatively high since part of the voltage is dropped across the matrix material.

According to a feature of the present invention, the method according to said second aspect of the invention may be employed to produce a liquid crystal device in which, when appropriate types of liquid crystal, such as nematic, smectic A or cholesteric are used, the deposited ligaments or droplets provide surfaces with which the liquid crystal molecules tend to align in the absence of an applied electric or magnetic field so that, in this state, the directors of the liquid crystal molecules have differing alignment axes throughout the body of liquid crystal material such that the scattering density of the disordered liquid crystal orientation is enhanced in the field-off state and switching between the different liquid crystal states is enchanced in response to the application and removal of the field since the surface alignment effect afforded by the ligaments or droplets provides a driving force which positively reorientates the liquid crystal molecules when the field is removed.

The liquid crystal material conveniently has an ordinary index of refraction which substantially matches the refractive index of the material of which the ligaments or droplets are composed. In a preferred embodiment, at least one of the boundary walls, between which the liquid crystal material and the droplets or ligaments are enclosed, has a refractive index substantially matching that of the material of which the ligaments or droplets are composed and also the ordinary refractive index of the liquid crystal material.

The material of which the ligaments or droplets are composed may be the same as the material of which the boundary walls are composed. The liquid crystal material may contain a pleochroic dye.

The ligaments as such may be deposited to form a skeletal fibrous structure which is permeated by a layer of liquid crystal material. The fibrous structure may be arranged to act as a spacing means between the boundary walls; alternatively the boundary walls may be held apart by spacing means separate from the fibrous structure.

The fibres preferably have a mean diameter less than about 5 micron and more preferably their mean diameter is sub-micronic.

Preferably the majority of the fibres lie substantially parallel to the boundary walls for most of their length. Particularly preferred is an arrangement in which no more than 30% of the fibers is orientated at an angle of less than 30 degrees, more preferably less·than 45 degrees, to the normal to the boundary layers.

The overall thickness of the liquid crystal layer and the fibrous structure is typically 1–40 microns, and whilst this may be thinner than devices based on the ecapsulated liquid crystal droplet approach, good contrast has been achievable with such thinner devices and this is believed to be attributable to the enhanced reorientation effect referred to above.

The liquid crystal/fibrous structure layer will be enclosed between two generally parallel boundary walls. In embodiment of the invention, the fibrous structure may initially be enclosed between the boundary walls and the liquid crystal material may be subsequently introduced into the fibrous structure for example, by introducing the liquid crystal material at one or more points along the edge or edges of the fibrous structure/boundary walls assembly and, in this case, the fibrous structure may act as a wick to aid distribution of the liquid crystal throughout substantially the entire extent of the fibrous structure.

In another embodiment, the fibrous structure may be deposited on one of the layers of material which is to constitute one of the boundary walls, the liquid crystal may then be applied to the fibrous structure to fill the voids thereof and the second boundary layer may thereafter be assembled, for example by means of a laminating operation, to enclose the liquid crystal-impregnated fibrous structure. Application of the liquid crystal to the fibrous structure may be effected by, for example, a coating apparatus in which the liquid crystal is spread over the fibrous structure, while the latter is exposed, by means of a rotating roller which dips into a resevoir of the liquid crystal. Aternatively, the liquid crystal may be applied by spraying it on to exposed fibrous structure.

In a presently preferred method, the fibrous structure is formed in situ on one of the boundary Walls prior to assembly of the boundary walls, by spinning fibers on to said one boundary layer to form a mat. Spinning may be effected by any suitable technique, for example, electrostatic, centrifugal or blow spinning.

Electrostatic spinning, for instance, may be employed to obtain an even distribution of fibers substantially randomly distributed in planes parallel to the boundary layer on which the fibres are deposited.

The fibres can be melt spun, but preferably are spun from solutions of fiber-formimg polymers chemically inert with respect to the liquid crystal material. The structure of the fibrous mat thus produced can be stabilised in the former case by arranging conditions such that the fibers are still soft when they fall on each other and, in the latter case, such that they still contain some solvent. Fiber-forming materials which cure at least partially in flight, either through contact with the open air or other ambient gas, or through applied heat or radiation, e.g. ultraviolet light, or through mixing of reactive precursors during spinning, can also be used, and again stabilisation of the resulting mat can be achieved by contacting the fibres before cure is complete. Fusion or bonding between the fibers themselves is generally preferred to application of a size or other bonding agent to the loosely-formed mat, although this latter does provide an alternative useful in some applications. Generally suitable polymers for solution spinning are polyvinyl alcohol(PVA) and polyvinyl butyral; PVA for example can be sprayed from a solution in a water/isopropyl alcohol mixture, to produce a mat substantially chemically inert to most common liquid crystals.

Such polymers may be selected to have a composition such that the refractive index of the fibrous substantially matches the ordinary refractive index of the liquid crystal material employed.

In one example of the invention where the ligaments are deposited to produce a fibrous structure, glass slides, 3 inches across and coated with indium tin oxide (ITO) to provide a transparent conductive layer, were covered by a mat of polyvinyl alcohol fibers electrostatically spun directly on to the ITO layer. A single electrostatic spray nozzle was used, consisting essentially of a central conducting core which tapered to a point at its lower end, surrounded by an insulating outer case having an aperture at its lower end through which the point of the core protruded. The case was spaced from the core to provide an annular passage through which the spray formulation was supplied to the pointed lower end of the core.

The pointed end of the nozzle was set approximately 200 mm above an earthed tray. The normally rapid divergence of the spray cloud was controlled by spraying in a cylindrical cage of nylon-insulated wire, approximately 300 mm in diameter, and held at high voltage relative to earth and of the same polarity as that applied to the nozzle core.

The spray formulation was a 3.5% solution of polyvinyl alcohol (molecular weight 125,000) in a 60:40 water-:isopropanol mixture, and this was supplied to the nozzle at a flow rate of 2 ml/hr, the nozzle voltage being +23 kV and the cage voltage being +6 kV. This resulted in a deposition footprint diameter of approximately 200 mm diameter in the spray tray.

To prepare the devices, the coated slides in turn were then placed on an earthed metal sheet with their ITO coated sides uppermost to receive the spray from the nozzle. Then with the spray already started, the slides were moved across the spray tray into the spray area and left for the required time as the fibrous mat built up. A range of mat thicknesses were deposited by varying the spraying times from 2.5 to 15 minutes, keeping the spraying conditions constant.

Some of the deposited fibrous mats were examined at about ×100 magnification, and the fibers could be seen as very thin, substantially straight lines, judged to be of sub-micron diameter. They appeared to be randomly orientated in the plane of the layer. It was noted that the mats produced in these experiments included throughout their structure numerous small blobs in addition to the fibers, the blobs being formed by localised accumulations of polymer in the fibres and being about 3-5 microns across. Such blobs may assist in affording a spacing function between the boundary layers when the fibrous mat or structure is required to act as a spacer. To complete the devices, a quantity of Merck ZLI 1289 nematic liquid crystal was placed on the mat, into which it promptly absorbed. A further ITO coated glass slide was placed on top, with its ITO coating against the filled mat. The whole assembly was then clipped together and evaluated by connecting the conducting coatings in the two slides to a 50 V AC supply.

With devices having a liquid crystal layer of about 10 microns thick, the scatter of light passing through the device was typically less than 10% or greater than 90% according to whether or not the electric field was switched on.

The invention will now be described by way of example only with reference to the accompanying drawings, in which:

FIGS. 2, 3 and 4 are schematic cross-sections through alternative spray heads which can be used in the apparatus of FIG. 1;

Figure 1:
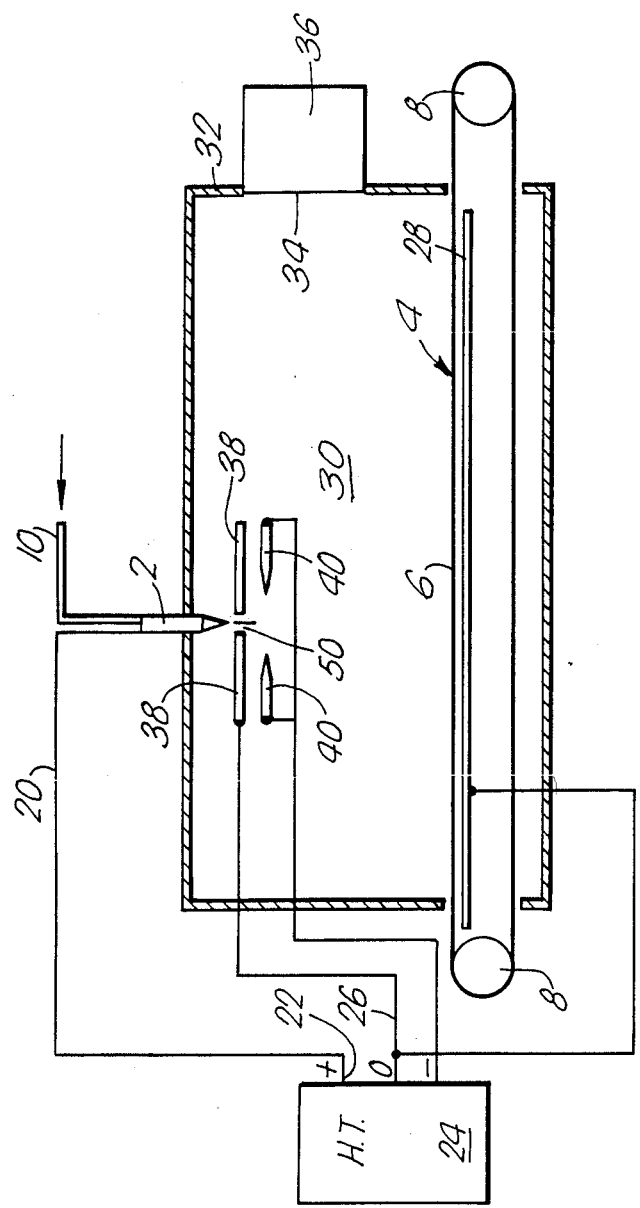
FIG. 1 is a schematic cross-section through apparatus for applying spacers onto sheet light transmitting material.

Referring to FIG. 1, the apparatus has an electrostatic spray head 2 directed at the belt 6 of a conveyor 4 running over rollers 8. In use a sheet of a light transmitting material, e.g. glass or PES is transported past the spray head on the conveyor.

The spray head is shown in more detailed cross section in FIG. 2. The spray head is linear, having a generally constant cross section. The spray head is made largely of insulating material or semi-conducting material such as TUFNOL (registered Trade Mark). Liquid to be sprayed is supplied via one or more channels 10 to a gallery 12. The gallery 12 distributes liquid to a slot 14 communicating with the center of a spraying site in the form of an edge 16. Although the slot naturally, has two sides, the electrostatic effect is that of one edge. That is to say only one set of ligaments is formed centrally. If the effect were that of two edges, ligaments would be produced off the "edges" at both sides of the slot.

Near the exit from the slot 14 at the spraying edge 16, is positioned a strip of conducting or semiconducting material, over the surface of which the liquid passes on its way to the spraying edge 16. The conducting or semiconducting surface 18 is connected via a high voltage supply lead 20, to one of the high output terminals 22 of a high voltage generator 24. Another intermediate voltage or earth potential output terminal 26 of the high voltage generator is connected to a reference surface 28 behind the conveyor on which the sheet to be sprayed is placed. Optional sharp discharge electrode 40 will be described below.

In use an electric field is defined between the sheet to be sprayed over the reference surface and the liquid arriving at the edge of 16. The edge 16 is sharp to a degree sufficient, in combination with the voltage produced by the high voltage generator, to define an intense electric field. Assuming the surface 18 has a positive potential relative to the reference surface, negative charge is conducted away from the liquid at its contact with the conducting or semiconducting surface, leaving a net positive charge on the liquid. The electric field at the liquid/air boundary at the edge 16 is sufficiently intense that the liquid is drawn out into ligaments spaced along the edge 16.

The liquid becomes positively charged, negative charge being conducted away by the conducting surface 18, leaving a net positive charge on the liquid. The charge on the liquid produces repulsive electrostatic forces which overcomes the surface tension of the liquid, forming cones of liquid, at spaced intervals along the edge 16. From the tip of each cone aligament issues. At a distance from the edge 16, mechanical forces cause it to break up into charged droplets of closely similar size. The number of ligaments which is formed, depends on the flow rate of the liquid and on the electric field intensity, amongst other factors such as the resistivity and the viscosity of the liquid. All other things being constant controlling the voltage and the flow rate, controls the number of ligaments, which enables the droplet size to be controlled and very closely similar. We find it necessary to dimension the spacing of the edge 16 from the conducting or semiconducting surface 18 suitably, in relation to the resistivity of the liquid being sprayed. We find that spraying will not take place if, given a spacing, the resistivity of the liquid is too high or, conversely, given a particular resistivity, the spacing is too great. A possible explanation for this observation is that in addition to the liquid becoming charged as it passes over the conducting or semiconducting surface, there is also conduction of charge away from the liquid at the edge 16 through the liquid. The resistance of this path must not be so high that the voltage drop across it results in the voltage at the edge 16 being too low to produce an atomising field strength. The distance between the edge 16 and the conducting or semiconducting surface 18 must therefore be sufficiently small to allow for the resistivity of the liquid being used. We have found that a suitable position can be found for the surface even when spraying, say, a liquid having a resistivity in the range $10^6$ to $10^{10}$ ohm cm.

The spray head 2 is directed into a chamber 30. Means is provided in the form of a source of ultra violet radiation 36, to treat the droplets in flight. The source 36 illuminates the droplets through a quartz window 34. The apparatus is used to deposit liquid droplets in which the cure has already started as a result of the treatment in flight. If the liquid being sprayed cures very fast, it may be necessary to shield the ligaments from exposure to the ultraviolet.

Source 36 may be replaced with a source of other electromagnetic radiation or with a means of mixing a gas or vapour catalyst with the droplets in flight. In other examples, with other liquids the ultraviolet source may be replaced with any suitable electromagnetic radiation source. e.g. visible light, infra red, micro wave, radio frequency etc.

Although only one spray head is illustrated, clearly a plurality could be used in the same chamber. Further the configuration of the spray head could be other than linear. For example, if very low outputs were required, the spray head could comprise an arrangement to produce a single ligament such as a single conducting capillary tube. An alternative form to give a higher output is an annular spray head in which, say, FIG. 2 is a section through one side of an annular ring.

In order to reduce the voltage required to produce electrostatic spraying, the reference surface may include a field adjusting electrode or electrodes 38 positioned near the spray head. The field adjusting electrode(s) may be made largely of a conducting or semiconducting material and may be at the same potential as the surface 28, as illustrated, or at some intermediate potential. As the or each field adjusting electrode is much closer to the spray head than is the surface 28, it requires a much lower potential difference between them to produce an electric field strength to induce electrostatic spraying. A position can be found for the field adjusting electrode(s) at which virtually none of the liquid being sprayed deposits on it. Almost all the spray deposits on the sheets carried by the conveyor 6 under the influence of the field between the spray head and sheet. In the case of a linear spray head, two linear electrodes 38 are provided which extend one along each side of and parallel to the spraying edge 16. In the case of a single capillary tube or annular spray head, the electrode 38 would be a ring surrounding the spray head.

In an alternative form, a gas or vapour catalyst is introduced into the chamber 30 via an inlet 56.

If it is desired to spray a two component liquid, it can be advantageous to use the spray heads illustrated in cross-section in FIGS. 3 and 4. As shown in FIG. 4, the spray head has two slots 14a and 14b, one for each of the liquid components. The exits of the slots 14a and 14b lie parallel to but spaced from the spraying edge 16. The liquid component in each slot 14a and 14b passes over the surface 18a or 18b of a conducting or semiconducting strip which is connected to the output of the high voltage generator 24. The two liquid components leave the slots 14a and 14b and pass over exterior surfaces 58a and 58b where the components remain separated. The components only meet at the spraying edge where the cones and ligaments which form contain both components. Although in the ligaments the components may not mix particularly well, when a droplet separates from a ligament it is thought to undergo several violent oscillations which mix the components. Whatever the explanation, the components are well enough mixed in the droplets to effect a cure.

The spray head illustrated in FIG. 3 has its liquid contacting conducting or semiconducting surface at the edge 16. That is to say the edge 16 is formed in the conducting or semiconducting material.

In other alternatives, three or more component liquids may be used, each liquid being fed to a common edge, but only meeting the other components on the exterior of the spray head. Thus a central slot in the spraying edge, as in FIG. 2, could supply a third liquid component. Further liquid components could be provided via further slots over exterior surfaces 60a and 60b in FIGS. 3 and 4.

The quality of the spray and the uniformity of the droplet size is sensitive to two factors amongst others.

When the spraying edge 16 is plain, at any given flow rate, the number of ligaments formed depends on the field strength at the edge. Increasing the field strength increases the number of ligaments. Increasing the number of ligaments at the same overall flow rate, has the effect that each ligament is finer so that the droplets it breaks up into are smaller.

The provision of gas or vapour catalyst may disturb or destroy the ligaments on which the uniform droplet size relies.

Figure 5:
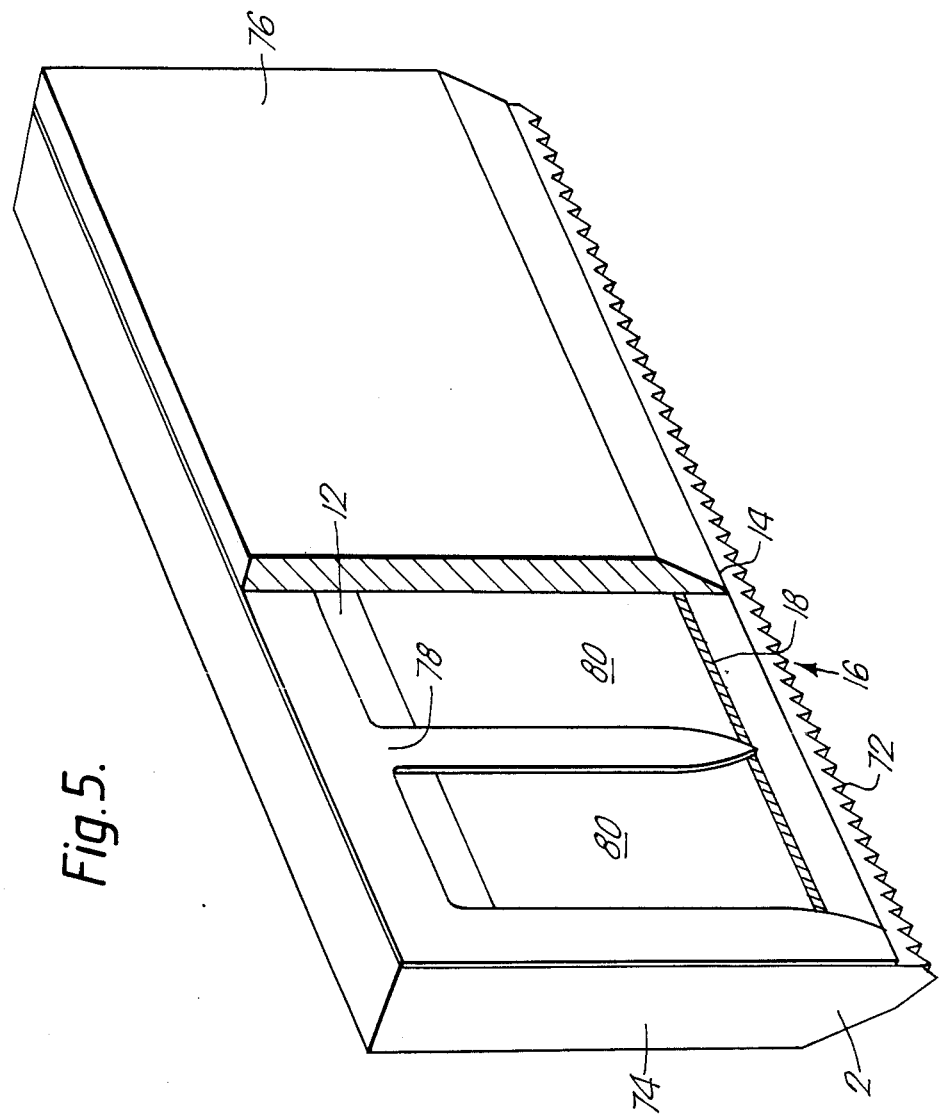
FIG. 5 is a perspective view, partly in section, of a further alternative spray head.

Generally, the control of droplet size is improved, and in particular sensitivity to these two factors is reduced by use of a spray head having a spraying edge 16 formed with spaced tips as shown in FIG. 5. The tips are provided in the example illustrated by teeth 72. The teeth 72 are formed in a body member 74 of insulating plastics or semi-conducting material. Liquid to be sprayed is provided via an inlet (not illustrated) to a liquid distribution gallery 12 in the body 74. A closing plate 76 is spaced from and sealed to the body member 74 by gasket 78. The gasket is open sided adjacent the teeth 72 defining a linear slot 14 between the body member 74 and the closing plate 76. The gasket is so shaped as to provide channels 80 to supply liquid from the distribution gallery 12 to the slot 14. Upstream from the mouth of the slot 14, a conducting or semiconducting strip 18 is inset into the body member 42 to provide a liquid contacting surface. The strip 18 is connected to the high voltage output of a high voltage supply (not shown in FIG. 5) to charge the liquid so that spraying takes place. In use the electric field strength at the tip of each tooth 72 is sufficient to produce a ligament, but the field strength between the teeth 72 is not sufficient to produce a ligament. This condition obtains over a wide range of voltages supplied by the high voltage generator, reducing the sensitivity of the droplet size to variations in voltage. Because each ligament is located at a particular physical point: the tip of a tooth, it is much less prone to disturbance by an air or gas stream passing the spray head.

Figure 6:
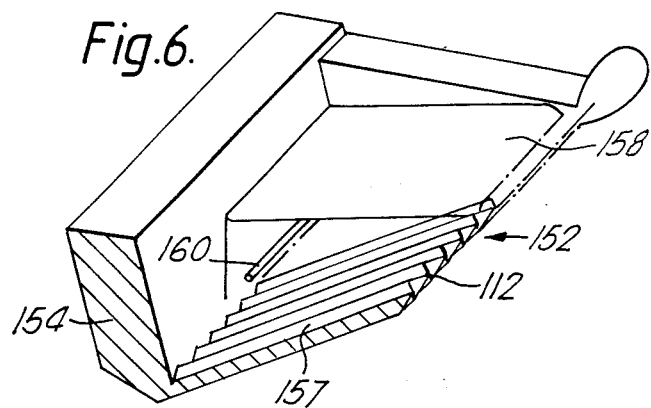
FIG. 6 is a perspective view of a yet further spray head.

FIG. 6 shows a generally robust form of nozzle which is less subject to blocking. The nozzle shown in FIG. 6 is in the form of a bath 154 made from an insulating plastics material, having teeth 112 formed along one edge 156. Grooves 157 in the base of the bath communicate with the tip of each tooth 112. In use the bath is filled with liquid 158 to be sprayed, to a level close to the edge 156. The level may be maintained by providing a continuous supply of liquid and allowing excess to return via an overflow (not shown) to be recycled. A conducting surface is provided in the embodiment illustrated by a wire 160 which is use is connected to the high voltage output 22 of the supply 24. Application of a high voltage to the wire 160 charges the liquid 158 and the resulting electric field propels it towards the teeth 112. When the liquid covers the teeth 112 the field strength at the tips of the teeth is sufficiently intense that the liquid is sprayed off as ligaments which break up into droplets as previously described. This embodiment has the advantage that it does not drip if spraying is halted by the interruption of the high voltage supply.

Figure 7:
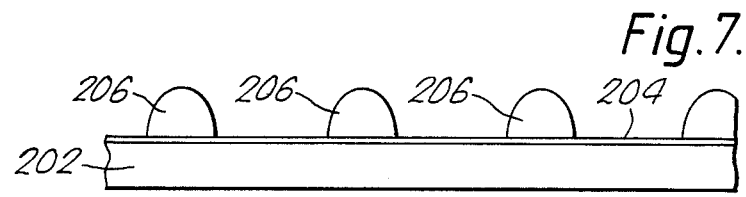
FIG. 7 is a section through a light transmitting sheet having spacers thereon produced by the method of the invention with the apparatus of FIG. 1.

Referring now to FIG. 7 there is shown a sheet of light transmitting material 202 which has been treated in the apparatus of FIG. 1. The sheet is PES. An alternative material is glass. On the upper surface of the sheet is a pattern of transparent conductor material 204 which, with a coating of transparent conductor on the opposing sheet in the assembled display will define the areas to be electrically stressed in the liquid crystal. A suitable material for the conductors is indium tin oxide. The sheet illustrated has been treated in the apparatus of FIG. 1 and has on its surface a random array of droplets. When droplets hit an object at a significant velocity, such as that achieved when the droplets have an electric charge from electrostatic spraying, there is a likelihood that the droplet will spread out in a thin layer if the viscosity is low. Generally, to produce droplets of the sizes useful for spacing liquid crystal displays, e.g. in the range 2-20 microns, the electrostatic spray head requires a low viscosity. In order to act as spacers, the droplets need to be of a liquid which will cure to produce a solid and, in order to overcome the problem, the cure is initiated in flight, for example by exposure to ultra violet light as illustrated. By the time the droplets hit the target, they have sufficient viscosity to retain a thickness which is a significant portion of their diameter in flight. The droplets wet the sheet so as to adhere thereto when cured. Alternatively, the droplets can cure to near solid provided they have a tacky surface to adhere to the sheet.

Figure 8:
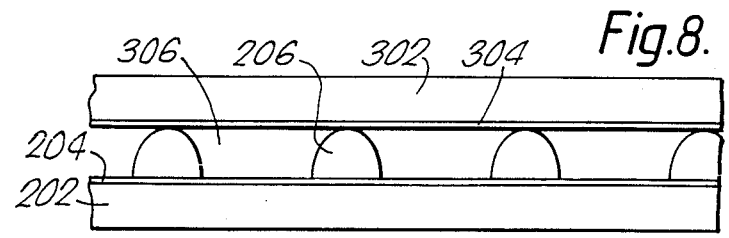
FIG. 8 is a section through a liquid crystal display assembled with the sheet of FIG. 7.

FIG. 8 shows the assembled display with a layer of liquid crystal 306, sandwiched between the sheet 202 and a second sheet of PES 302 on which is provided coating (e.g. in a pattern) of transparent conductor 304 which with the layer 204 defines the areas of liquid crystal to be addressed.

The droplets may be completely cured before assembly. Alternatively, the droplets may be partly cured, for example leaving a tacky surface finish capable of adhering to the sheet 302. In this case the display is held together by the spacers and the cure is completed after assembly.

Figure 9:
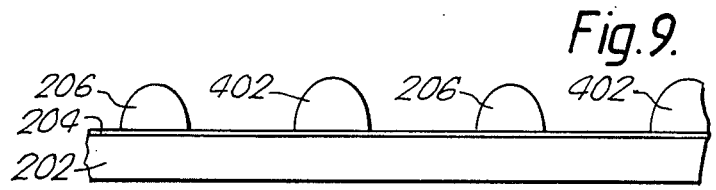
FIG. 9 is a section similar to FIG. 8 having also particles of pressure sensitive adhesive.
Figure 10:
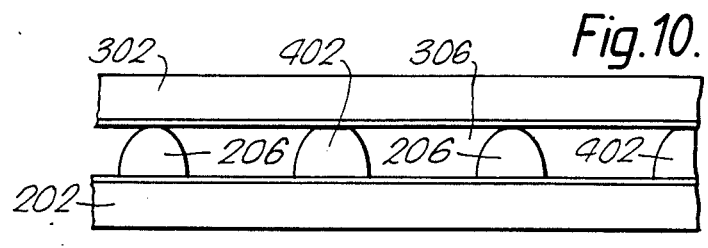
FIG. 10 is a section through a liquid crystal display assembled with the sheet of FIG. 9.

In the example illustrated in FIG. 9 the spacer droplets 206 are applied and cured, and then a second random pattern of spaced droplets is applied by the same process. The droplets 402 in the second pattern are thicker than the droplets 206 first applied. The greater thickness may be achieved by spraying larger larger droplets, or by ensuring the droplets spread less on impact by using higher viscosity liquids, by curing the liquid more in flight to achieve a greater viscosity on impact, or by there being less electrical charge on the droplets. The liquid may be the same as the first in which case the droplets 402 are not cured completely until after the display has been assembled. As illustrated in FIG. 10, the sheets are pressed together deforming the part cured droplets 402 until the sheet 302 meets the cured droplets 206.

Alternatively the second liquid may cure to form a pressure sensitive adhesive. In this case the sheets 302 and 202 are also pressed together until the spacer droplets 206 meet the sheet 302 as illustrated in FIG. 10. One of the features of charged droplets produced by electrostatic spraying, is that they are highly mobile towards any surface of opposite charge or at ground potential. This feature can be used to ensure that the material deposits on the sheet on the conveyor 8. The high mobility does introduce a problem, however. In particular it reduces the flight time of the droplets before they reach the sheet and thus reduces the time the droplets have to begin curing before hitting the sheet.

Optionally the apparatus may include means to discharge the spray thus increasing the flight time.

Spaced from and down steam of the spray head are two sharp discharge electrodes 40. The discharge electrodes are placed out of the flight path of the droplets but are directed inwardly toward the flight path. In the case where the spray head is linear, the discharge electrodes may also be linear, extending perpendicular to the plane of the paper, and having a sharp serrated edge 41. An alternative is to use a carbon fiber brush. There may be circumstances where a suitably positioned single electrode would suffice. A field adjusting electrode, shield electrode 38, is positioned between the spray head and the discharge electrode. The high voltage generator 24 has a reference output 44 connected to the shield electrode 38. The spray head (that is to say the liquid contacting surface of the spray head) is connected to a high voltage output 46 from the generator of one polarity relative to the shield electrode 38. The discharge electrode 40 is connected to a high voltage output 48 from the generator, of the other polarity relative to the shield electrode. Thus the output 46 could be positive relative to the shield electrode 44, whilst the output 48 is negative.

One of the functions already described of the shield electrode 38 is to define with the spraying site in the form of the sharp spraying edge, a sufficient electric field strength to induce electrostatic spraying from the spray head 2.

The shield electrode 38 has an orifice 50 aligned with the spray head 2 and sufficiently large that the ligaments or the droplets pass through, dependent on whether the ligaments break up before or after the shield electrode, to produce a spray of droplets beyond the shield. If the orifice were too small the droplets or ligaments would deposit on the shield electrode 38. A small orifice is required in the present apparatus for reasons explained below.

In order to prolong their flight time the droplets which issue through the orifice 14 are discharged. This is effected by the discharge electrodes 40. The discharge electrodes 40 are driven to a sufficiently high voltage relative to the shield electrode 38 as to produce a corona discharge. The negative ions so produced, discharge droplets in the spray issuing through the orifice 50.

The distinction between charged droplets and discharged droplets is very obvious visually. Any droplets remaining charged in the spray are highly mobile in a predictable path. Discharged particles appear as a cloud or smoke which drifts unpredictably in any slight air currents. The effect of the shield electrode can be understood by considering what happens as the voltage on the discharge electrode is increased from a voltage insufficient to cause ionic discharge.

The or each ligament breaks up into droplets which separate into a spray bounded approximately by a cone. Within the spray, the charged droplets are highly mobile in predictable paths generally towards earth or a surface of opposite polarity. At a threshold, the voltage is sufficiently high that the electric field strength around the sharp tip of the discharge electrode ionises the surrounding air leaving free negative ions. These discharge surrounding droplets in an area around the tip of the discharge electrode. The discharged droplets are easily identifiable visually. They lose their predictable mobility, becoming a drifting smoke which is very distinct from the charged droplets. As the voltage is increased droplets are discharged further from the discharge electrode, so that more of the spray is discharged. When the voltage applied to the electrode is sufficiently high that the boundary of the discharged droplets reaches the edge of the spray cone, the spray would be completely discharged. Unfortunately, at this point, in the absence of the shield electrode, the corona is uncontrollably attracted to the cone at the base of the ligament or to the spraying edge 16 itself, which discharges the cone. Since it was the charge on the liquid which overcame the surface tension thereof to form the cone and repel the ligament therefrom, discharging the cone destroys the spray.

The shield electrode 38 is arranged to shield the spraying edge 16 and the cone of liquid from the corana thus enabling all droplets in the spray to be discharged without danger of the cone being discharged. To achieve this, the orifice 50 must not be too large otherwise corona will find its way through. As mentioned above, the orifice must not be to small either, otherwise the droplets will not spray through the orifice but will deposit on the shield electrode. We have found it entirely possible to balance these conflicting requirements so that the orifice can be at the same time neither too large or too small. Complete discharge of the spray can be assured by adjusting the position of the discharge electrode 40 and the voltage applied thereto.

The overall dimensions of the shield electrode must be sufficient to prevent corona reaching the cone of liquid at the base of each ligament or the spraying edge, round the outside of the electrode. The shield electrode 38 may be metallic but need not necessarily be such a good conductor as that. What is required is that the shield electrode should be sufficiently conducting to remove any charge which may accumulate due to the ionic discharge. The discharged droplets will slowly settle downwards in the apparatus at a rate dependent on their size and density and any air movements.

Where the device is intended for use in controlling light transmission, e.g. as an optical shutter, the droplets in addition to acting as spacers may also serve to provide curvilinear surfaces with which molecules of suitable liquid crystal materials, e.g. nematic, cholesteric or a combination thereof, can align in the absence of an applied electric field so that, in this condition, the liquid crystal molecules have their axes directed in a wide range of directions and incident light is scattered. When the electric field is applied, the liquid crystal directors align with the field in generally parallel relation with each other to minimise light transmission.

Figure 12:
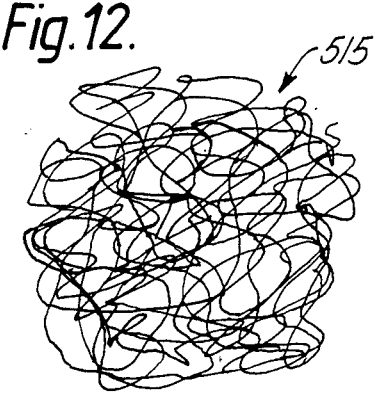
FIGS. 12 and 12A are diagrammatic plan views illustrating the distribution of fibers in a plane parallel to one of the boundary walls of the device of FIG. 11.
Figure 13:
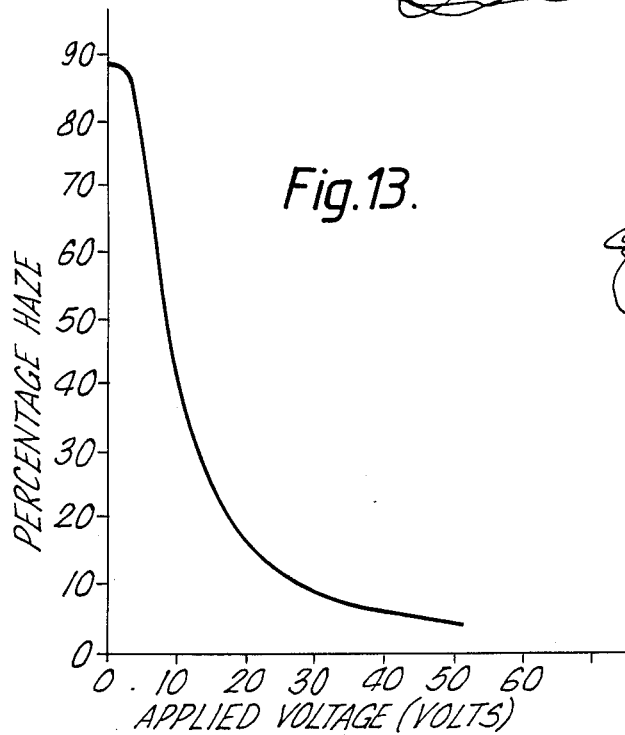
FIG. 13 is a graph showing the relationship between haze and applied electric field.

Instead of being deposited as droplets, the sprayed material may be deposited as ligaments to form fibers as will now be described with reference to FIGS. 11 to 13.

Figure 11:
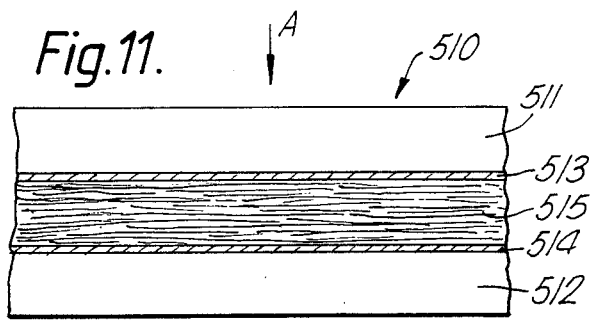
FIG. 11 is a diagrammetic cross-sectional view of another embodiment of the invention.

As shown in FIG. 11, the display panel 510 comprises upper and lower transparent boundary layers 511 and 512 which may, for example, be composed of a flexible plastics material, such as PES the contiguous faces of which each have a layer 513, 514 of transparent conductive material such as indium tin oxide applied thereto. The boundary layers 511 and 512 are spaced apart by a skeletal fibrous structure 515, the intersecting fibres (see FIG. 12) of which define a myriad of voids filled with liquid crystal material so that the space between the boundary layers is occupied by a layer of liquid crystal in which the fibrous structure 515 is, in effect, immersed.

The fibrous structure 515 may be created by the spinning techniques described herein. In some circumstances, the boundary walls and the fibres may be composed of the same material. Usually the fibres will have a mean diameter of sub-micronic size. The majority of the fibers are arranged with their longitudinal axes lying predominantly in planes parallel to the boundary layers 511, 512 so that the surface interaction previously referred to which takes place between the fibers and the liquid crystal molecules tends to cause the latter to align with their axes lying predominantly parallel to the boundary layers and hence predominantly perpendicular to the direction A of light transmission through the panel 510.

When an electric field is applied to the panel by means of the conductive layers 513, 514, i.e. so that the field is perpendicular to the plane of the panel, the liquid crystal molecules align with the applied field and hence the light transmission direction A; in this condition, the liquid crystal/fibrous structure is substantially transparent. When the applied field is removed, the liquid crystal molecules tend to reorientate towards a condition in which their axes are generally parallel with the plane of the panel and the speed with which this occurs is enhanced by the presence of the fibrous structure, thereby enabling rapid switching between a transparent state and a light scattering state.

Because the voids occupied by the crystal are not in the form of closed pores, there will exist through the liquid crystal between the electrode layers 513, 514 conductive pathways (albeit labyrinthine at least to some extent) which are uninterrupted by fibers and this, together with the fact that the fiber density per unit volume is in any event relatively low, is believed to allow switching from the scattering state to the transparent state to be achieved at relatively low voltages. FIG. 13 illustrates the variation of scattering/haze with voltage for a device made using the specific method described above involving the use of electrostatic spinning. It will be noted that the level of haze falls rapidly over a relatively narrow range of voltage.

Also, because of the enhancement in liquid crystal reorientation afforded by the presence of the fibrous structure, it becomes feasible to use lesser quantities of liquid crystal and this, in turn, permits the use of thinner panels and reduction in costs.

Figure 12A:
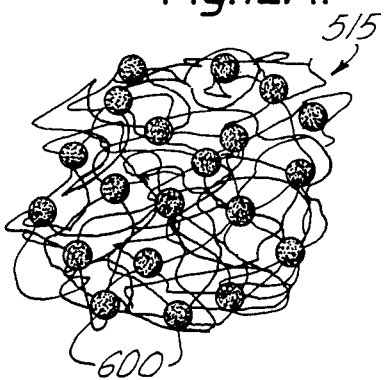

By appropriate control of the molecular weight of the polymer and concentration thereof in the solvent, the fibers may be deposited in a form in which, as shown in FIG. 12A, the fibers have localised accretions or enlarged nodules 600 of the polymer along their length. These enlarged nodules 600 may be of the order of microns, e.g. 3–5 microns, in diameter whilst the fiber lengths linking them will usually be of sub-micronic diameter. The blobs can act as spacers for the boundary walls if desired and together with the fibers they provide surfaces with which the liquid crystal molecules can align in the field-off-state.

We claim:

1. A method of making a liquid crystal device including the steps of:
    (a) directing towards a first sheet which is to form a boundary wall of the device ligaments derived from a curable liquid and allowing the ligaments to deposit as such or as droplets resulting from breaking up of the ligaments;
    (b) assembling a second sheet in superimposed relation with the first sheet so that the deposited ligaments or droplets occupy the space between the sheets; and
    (c) applying liquid crystal material so that it permeates the spaces between the deposited ligaments or droplets.

2. A method as claimed in claim 1 in which step (c) precedes step (b).

3. A method as claimed in claim 1 in which step (b) precedes step (c).

4. A method as claimed in claim 1 in which the ligaments are deposited in a form in which they exhibit localised enlarged nodules.

5. A method as claimed in claim 1 in which the curable liquid is formed into ligaments by subjecting the curable liquid to an intense electric field.

6. A method as claimed in claim 1 including treating the curable liquid in flight to initiate curing.

7. A method as claimed in claim 6 in which said in flight treatment of the curable liquid comprises exposure to radiation.

8. A method as claimed in claim 1 including completing curing of the curable liquid after assembling the second sheet in superimposed relation with the first sheet.

9. A method as claimed in claim 1 including completing curing of the curable liquid before assembling the second sheet in superimposed relation with the first sheet.

10. A method as claimed in claim 1 including providing electrode means as part of the assembly to allow an electric field to be applied to the liquid crystal material.

11. A method as claimed in claim 1 in which at least one of said sheets is light transmissive.

12. A method as claimed in claim 11 in which the refractive index of the cured deposited ligaments or droplets substantially matches that of the light transmissive sheet or at least one of the sheets if both are light transmissive.

13. A method as claimed in claim 1 in which the refractive index of the cured deposited ligaments or droplets substantially matches the ordinary refractive index of the liquid crystal material.

14. A method as claimed in claim 1 in which the ligaments are deposited so as to form a skeletal structure of intersecting fibers and in which the liquid crystal material is applied so as to permeate the voids within the structure.

15. A method as claimed in claim 14 in which said skeletal fibrous structure functions as the sole or primary spacing means between the first and second sheets when assembled.

16. A method of making a liquid crystal display device, including: spraying a curable liquid by a process comprising delivering the liquid to a spraying site of an electrostatic spray head, making electrical contact with said liquid via an electrically conducting or semiconducting liquid contacting surface; charging the liquid contacting surface to a high voltage of one polarity relative to a reference surface, to intensify the electric field strength at the spraying site sufficiently that the liquid at the spraying site is drawn out preponderantly by electrostatic forces into at least one cone from which a corresponding ligament issues directed towards one surface of a sheet so that, on impact with the sheet, the liquid both wets or adheres to the sheet and retains a substantial thickness relative to its diameter in flight, and applying liquid crystal material to the resulting assembly of said sheet and the material deposited on the sheet by electrostatic deposition of said liquid.

17. A method as claimed in claim 16, including treating the liquid in flight to initiate curing.

18. A method as claimed in claim 16, wherein the ligament or ligaments break up into charged droplets of closely similar size.

19. A method as claimed in claim 1, wherein cure is initiated by exposure in flight to ultra violet radiation.

20. A method of making a liquid crystal display device, including: spraying a curable liquid by a process comprising delivering the liquid to a spraying site of an electrostatic spray head, making electrical contact with said liquid via an electrically conducting or semiconducting liquid contacting surface; charging the liquid contacting surface to a high voltage of one polarity relative to a reference surface, to intensify the electric field strength at the spraying site sufficiently that the liquid at the spraying site is drawn out preponderantly by electrostatic forces into at least one cone from which a corresponding ligament issues directed towards one surface of a sheet so that, on impact with the sheet, the liquid both wets or adheres to the sheet and retains a substantial thickness relative to its diameter in flight, treating the liquid in flight to initiate curing, assembling the sheet with another sheet so that the cured liquid acts as spacers between the sheets and filling the space therebetween with liquid crystal.

21. A method as claimed in claim 20, including completing the cure of the liquid after the said assembly so that the liquid adheres to both sheets.

22. A method as claimed in claim 20, including completing the cure of the liquid before said assembly.

23. A method as claimed in claim 22, including spraying a second liquid by the said process towards the surface of one or other of the sheets, the second liquid being curable to form a pressure sensitive adhesive, treating the second liquid in flight to initiate curing so that on impact with the sheet the second liquid both wets or adheres to the sheet and retains a thickness greater than that of the spacers, and assembling said sheets so that said adhesive acts to hold the sheets together at a spacing determined by the spacers.

24. A method of making a liquid crystal display as claimed in claim 22, including spraying a second or the same curable liquid by the said process towards the surface of one or other of the sheets, treating the second liquid in flight to initiate curing so that on impact with the sheet the second liquid both wets or adheres to the sheet and retains a thickness greater than that of the spacers when cured, assembling the sheets together and completing the cure of the said second or same liquid which thereby acts to hold the sheets together at a spacing determined by the spacers.

25. A liquid crystal display device made by the method claimed in claim 1, wherein the deposited ligaments form a skeletal structure of intersecting fibers permeated by the liquid crystal material.

* * * * *